Aug. 15, 1961   E. G. GRIFFITHS ET AL   2,995,793
ROTARY STUD FASTENER
Filed May 11, 1959   2 Sheets-Sheet 1
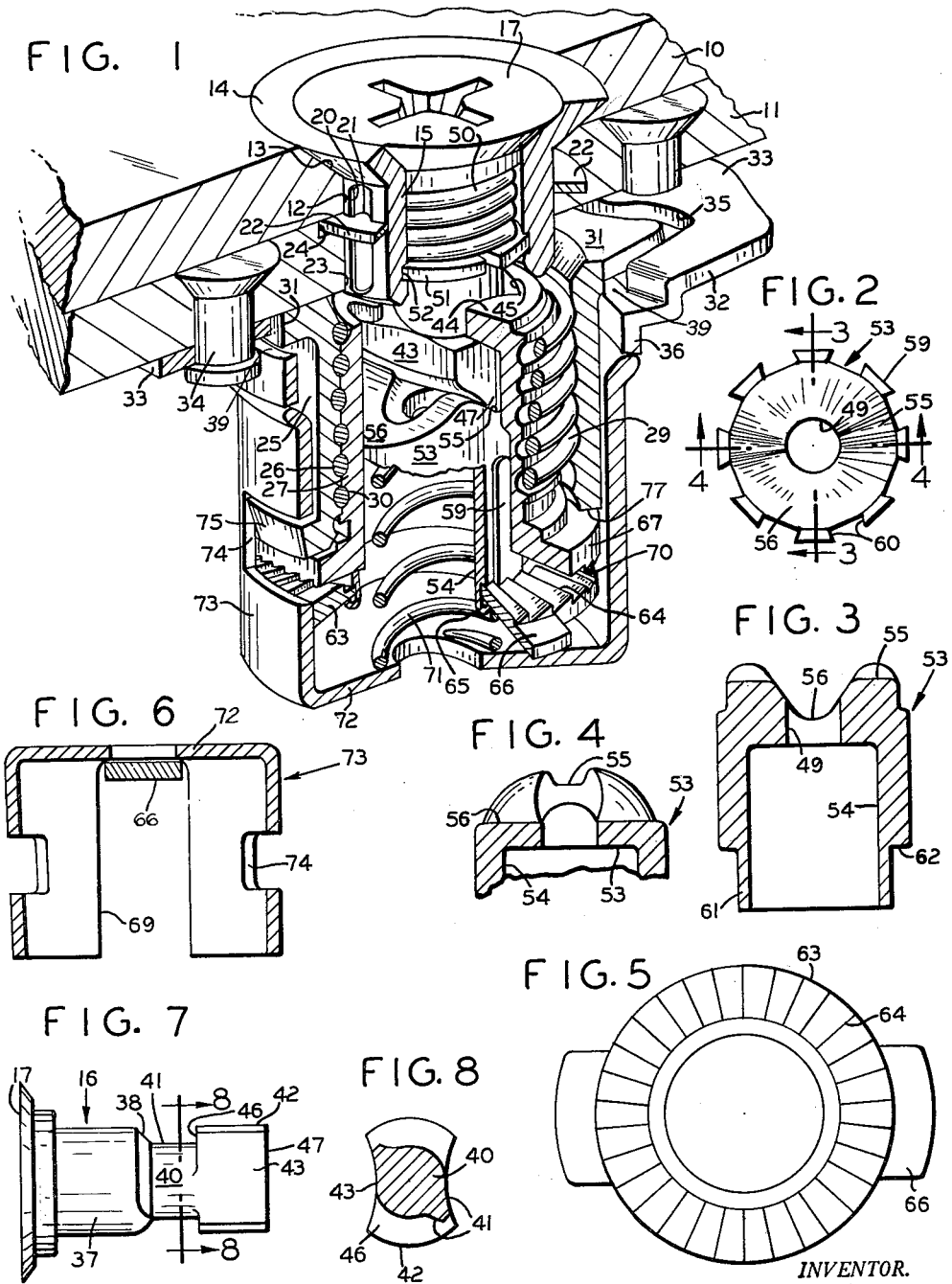
INVENTOR.
EDWARD G. GRIFFITHS
EDO H. STOCKER
BY John P. Chandler
THEIR ATTORNEY.

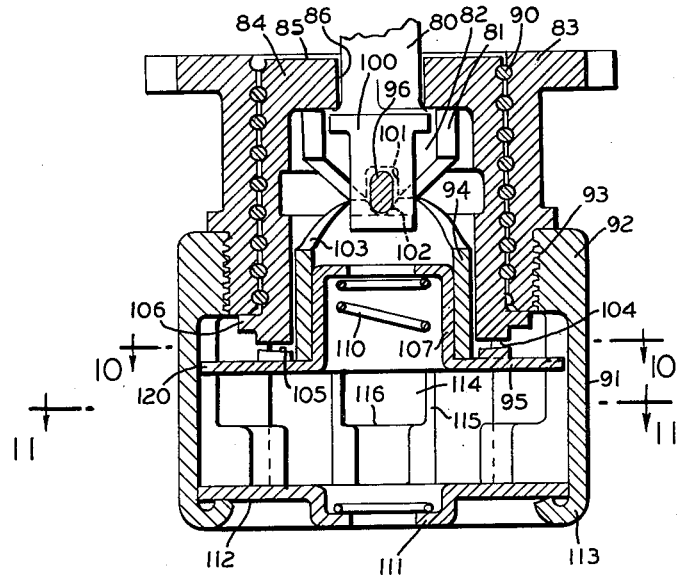
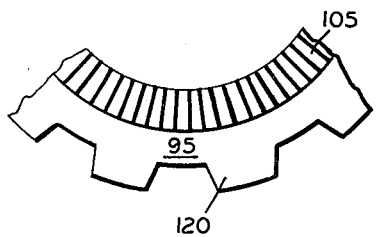
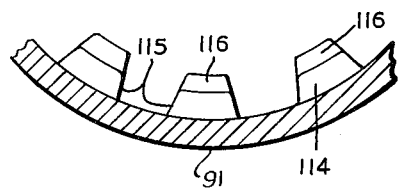

United States Patent Office 2,995,793
Patented Aug. 15, 1961

2,995,793
ROTARY STUD FASTENER
Edward G. Griffiths, Maywood, and Edo H. Stocker, Dumont, N.J., assignors to Camloc Fastener Corporation, Paramus, N.J., a corporation of New York
Filed May 11, 1959, Ser. No. 812,306
7 Claims. (Cl. 24—221)

This invention relates to a novel fastener which can be quickly fastened and unfastened with equal facility and relates more particularly to an improved fastener of the rotatable stud type which can be manipulated to fastened position by one full turn of the stud, or even less.

An important object of the invention is to provide an improved fastener for attaching panels to structures and for other purposes wherein the fastening elements are quickly moved to fully locked position without any relaxation of tension, as opposed to fasteners employing a helical ramp and detent.

The improved fastener of the present invention has particular usefulness in connection with stressed panels for aircraft wherein it has been a common practice to use screws or bolts extending through match-drilled holes to engage a threaded self-locking nut plate riveted to the rear surface of the structure. This common type of arrangement allows for pulling the sheets tightly together only after a comparatively large number of revolutions and depends largely upon friction built up in the plate nut for preventing unscrewing of the bolt due to vibration or other factors.

The shear stresses to which a stressed panel is subjected must be resisted by structural reinforcement around the opening and accordingly it becomes necessary to employ a comparatively large number of fasteners around the opening.

An object of the present invention is to provide an improved fastener to replace the bolt and plate nut arrangement in structure and panel. In the instant fastener, however, the friction threaded engagement is always fully engaged and the parts having this threaded engagement are never removed from full frictional contact and engagement with the other. Also it is not necessary to have any finding or proper mating of threads and the threads cannot become crossed nor short threaded.

This is accomplished by forming the stud in two sections which are interlocked together, one of which remains in the threaded receptacle or nut portion when the parts are unfastened. Once the interlock has been effected rotation of the two-part stud can continue until the sheets are drawn together. Danger occurs when this forward rotation continues before the interlock occurs since it drives the stud extension further away from any possible interlocking with the stud and in many instances drives it right out of the receptacle or nut.

Accordingly, it is an important object of the present invention to provide means for positively locking the stud extension against any forward rotation until its positive interlock with the stud has been effected. This is accomplished by a novel mechanical interlock between the stud extension and the nut device employing what may broadly be termed pawl and ratchet means which can be displaced or released only by the rotation of the stud necessary to effect the interlock between the stud and stud extension. More specifically, this release cannot be effected by axial movement of the stud into the stud extension, nor by any other force acting axially as distinguished from rotationally. This arrangement positively assures against any premature release of this important mechanical interlock.

Another object of the invention is to provide a fastener which under normal conditions requires less than one turn to fasten it or unfasten it and wherein its application is more reliable than any other currently known fastener used for the same purpose and wherein its useful life is many times that of the self-locking nut type.

Yet another object of the invention is to provide improved locking means to prevent the structure from becoming unfastened due to vibration and wherein the operator always knows when and if the fastener is in fully locked position.

A further object of the invention is to provide a novel fastener of the rotatable stud and receptacle type wherein there is provided resiliently loaded detent means for cooperating with the lower end of the stud, one of the members having a male portion and the other having a detent to receive the male portion under elastic load to resist rotation of the stud and this elastic load is constant and undiminished at all times.

In the drawings:

FIG. 1 is a perspective view of a fastener embodying the present invention, parts of the structure being broken away to show the internal arrangement.

FIG. 2 is a top plan view of the cylindrical detent member.

FIG. 3 is a section taken on line 3—3 of FIG. 2.

FIG. 4 is a broken section taken on line 4—4 of FIG. 2.

FIG. 5 is a plan view of the ratchet plate.

FIG. 6 is a central section taken through the sheet metal cap.

FIG. 7 is a side elevation of the rotatable stud.

FIG. 8 is a section taken on line 8—8 of FIG. 7.

FIG. 9 is a section taken through a modified construction of the fastener.

FIG. 10 is a broken section taken on line 10—10 of FIG. 9.

FIG. 11 is a broken section taken on line 11—11 of FIG. 9.

The fastener assembly of the present invention may be used for securing a removable sheet 10 to a sheet 11 fixed on a structure. The removable sheet has an opening 12 which is outwardly tapered at its upper end 13 to receive the flared head 14 of a spring cup 15 in flush mounting relation. A stud 16 of special contour (FIG. 7) and having an enlarged head 17, is received in the spring cup in flush relation to the latter and to the upper sheet. The spring cup has one or more vertical recesses 20 on its outer periphery which receive tabs or fingers 21 formed on the inner periphery of a retaining ring 22. This retaining ring keeps the spring cup captive in sheet 10.

Sheet 11 has an opening 23 to receive the lower end of the spring cup when the sheets are in face-to-face engagement and at its upper end the opening has a counterbore 24 to receive retaining ring 22. The spring cup is of rugged construction and takes shear loads between the sheets.

The female component of the fastener is carried by the fixed sheet and includes a cylindrical receptacle or nut element 25 having internal threads 26, and carries the stud extension 27 which structurally may be considered as an internal nut or insert having external threads 30. A helical wire thread element is interposed between the internal and external threads and some portion or portions of the wire threads are preferably deformed or otherwise made out-of-round in order to provide a measure of resistance to rotation of the stud extension within the receptacle.

The receptacle or nut device has two opposed flanges 31 at its upper end which are received within a sheet metal mounting cage 32 having attaching ears 33 secured by rivets 34 to the lower sheet. The cage has suitable punched-out sections 35 to receive flanges 31 in floating relation to provide for minor misalignment of the sheet openings. The flanges 31 are mainly supported on the lower edges 39 of these punched-out sections. It also has a central, downwardly extending annular flange 36 of larger internal diameter than the receptacle which is received in the latter in floating relation.

Returning now to the details of the stud shank, there is formed a full diameter section 37 below the head and below this full diameter section there is a taper 38 leading to a section of special cross sectional contour, comprising a central section 40 which is generally circular and has opposed portions extending laterally therefrom forming wings, each of which has driving faces 41 for a purpose to be described. Below the winged section there is a section providing abutments 42. This section 42 was originally of full diameter, i.e., same diameter as section 37, except for two opposed concave recesses on its outer periphery giving the section a generally hour glass shape.

Means for effecting the interlock between the stud parts is a bayonet-type arrangement. The stud extension or insert 27 has an upper wall 44 provided with an hour glass shaped opening 45 so proportioned as to permit lower section 42 of the stud shank to pass readily therethrough. The upper faces 46 of this latter section are flat and are on a plane normal to the axis of the stud and there is formed a transverse or radial rib 47 at the lower end of this section. The stud is mounted in the spring cup 15 and is urged upwardly when the parts are unfastened by means of a spring 50 carried on the full diameter section 37 and which engages a split spring retaining washer 51 positioned in an internal annular recess 52 at the lower end of the spring cup.

Cooperating with radial rib 47 at the lower end of the stud is a detent member 53 shown in detail in FIGS. 2, 3 and 4, and having a downwardly extending cylindrical extension 54. This detent member has a central opening 49 and on its upper surface two opposed recesses or detents 55 which receive the rib 47 when the parts are in the locked position of FIG. 1. Disposed at right angles to detents 55 are recesses 56 of greater depth than detents 55 and the two sets of recesses are connected by helical surfaces or cam pathways.

Lower cylindrical section 54 has splines or keys 59 on its outer surface. A conventional showing of these splines is made in FIG. 1, and in FIG. 2 they are shown as having been formed by the use of a milling cutter which accounts for the parallel walls 60 between each adjoining pair of splines. At the lower end of section 54 there is formed an external annular recess leaving a thin wall section 61 and a shoulder 62 at its upper end.

A mechanical interlock between nut device 25 and stud extension 27, preventing rotation of the latter until positive engagement or interlock has been effected between the stud and stud extension, is a pawl and ratchet arrangement. It includes a circular plate 63 having a central opening and ratchet teeth 64 on its upper face. This plate, which is the pawl element even though it has more than one tooth, is received on this thin walled section 61 and abuts against shoulder 62. The lower end of the thin wall section is rolled outwardly and upwardly at 65 to secure the pawl plate thereon although this plate may turn freely relative to the detent member. To prevent rotation of the plate 63 relative to the receptacle, it has two radial extensions 66 received in opposed slots 69 in a fixed member or cap 73 carried by the receptacle 25.

The stud extension 27 has an outwardly extending annular flange 67 at its lower end having ratchet teeth 70 on its lower face which cooperate with ratchet teeth 64. A spring 71 urges the detent structure upwardly, said spring being mounted at its lower end on the base wall 72 of the sheet metal cap 73 which has opposed openings 74 in its side walls. The receptacle has a pair of opposed lugs 75 which extend radially outwardly whose outer faces are tapered downwardly and inwardly. These tapered faces aid in forcing the cup up into position over the lugs. This cup in addition to serving as a mounting base for spring 71, and to prevent rotation of pawl plate 63, also serves to limit downward travel of the stud extension. Flange 67 of the stud extension serves to limit upward travel thereof when this flange contacts the lower end 77 of the receptacle.

FIG. 1 shows the fastener in locked position wherein there is a positive interlock between the stud and stud extension after such interlock has been effected by rotating the stud one-quarter turn. By this novel arrangement one part 16 of the stud is left in the female component or receptacle 25 at all times and the two parts 16 and 27 of the stud can be disengaged by rotating stud 16 one-quarter turn in a reverse direction. This latter action also causes radial rib 47 to leave shallow detents 55 and enter the deeper detents 56 which frees the detent member 53 for upward travel whereby the complemental ratchet teeth 64 and 70 become engaged. This prevents rotation of the stud extension or insert since pawl plate 63 is held against rotation.

This initial one-quarter turn of the stud in unfastening direction allows abutments 42 to become aligned with opening 45 in upper wall 44 and the stud is moved upwardly by spring 50 allowing upper plate 10 to be removed.

If the sheets were earlier tightly secured together the upper faces 46 of the abutments firmly engaged the lower face of upper wall 44. Reverse rotation of the stud, as just described, has not effected any reverse rotation of the stud extension so when the stud is reinserted to again fasten the parts the abutments do not generally get down far enough to underlie the lower face of wall 44. This makes it necessary to back the insert upwardly far enough to permit this reengagement.

In prior fasteners of this general character the operator might turn the insert one-quarter or even one-half a turn and then rotate forwardly, hoping, though not knowing, that he had engagement. If engagement had not been effected he would proceed to rotate the stud and move the insert right out of the lower end of the receptacle. If there are a large number of fasteners and the receptacles are in blind location this causes serious trouble.

In the present invention, however, he cannot produce any forward rotation of the extension and, hence, of the stud, until he has secured engagement and this is produced only when the stud has moved downwardly relative to the extension a sufficient distance to separate the ratchet plates. When this is accomplished, and only then, can the stud be rotated forwardly. When the operator finds that forward rotation is denied him, he merely tries reverse rotation in short increments, say one-quarter turn, and each of these increments backs the stud extension further upwardly. Each such reverse rotation is followed by attempted forward rotation and after one, two or at most three attempts he finds forward rotation possible, and in less than one turn thereafter he has secured engagement and brought the sheets together.

In some instances where excessive torque has been applied to the stud the screw action of the latter has been destructive of the ratchet teeth, and a modified arrangement to prevent this occurrence is shown in FIG. 9. In this instance a more conventional stud 80 having abutments 81 is employed, and concave walls 82 connect these abutments. The receptacle 83 is substantially the same as the receptacle in the first embodiment and the stud extension 84 again has an upper wall 85 provided with an opening 86 shaped to pass the abutments therethrough. The receptacle and stud extension, respectively, have the internal and external threads and a wire thread form 90 is positioned therebetween in order to resist rotation of the stud extension.

The cap 91 in this instance is a stronger element structurally than is the sheet metal cap of FIG. 6 and it has a thickened upper ring section 92 having an internally threaded connection at 93 with the lower end of the receptacle.

A modified detent member 94 and pawl plate 95 is provided and instead of the radial rib 47 on the lower surface of the abutments and in alignment therewith as in FIG. 1, the member which engages the detent plate and lowers it to disengage the ratchet teeth is a cross pin 96 disposed at right angles to the abutments and mounted in an opening in a substantially U-shaped clip 100 formed of spring sheet metal. The lower end of the stud has a slot 101 to receive the cross pin.

The detent member is of cylindrical shape and has two opposed shallow detents or recesses 102 at its upper end which correspond to detents 55 in FIG. 1. Extending downwardly from each side of these detents are deeper recesses 103. The lower end of the stud extension has ratchet teeth 104 which engage oppositely facing or complemental ratchet teeth 105 formed on the upper surface of pawl plate 95. Above the ratchet teeth 104, at the lower end of the stud extension, is an external annular shoulder 106 which engages the lower end of the receptacle and limits upward travel of the stud extension therein.

The pawl plate 95 supports the lower end of the detent member 94 and said plate is formed with an upwardly extending central cylindrical section 107 fitting within the detent member and forming a seat for the upper end of a compression spring 110. The lower end of the spring is supported in a central recessed portion 111 of a base plate 112 at the lower end of cap 91. The lower peripheral edge of cap 91 is rolled inwardly at 113 to secure the plate.

The cap has a plurality of spaced, internal splines 114 each being defined on opposite sides thereof by opposed inwardly inclined walls 115 and inwardly extending seats 116 are formed about half way down each spline.

The pawl plate 95 is prevented from rotating relative to cap 91 and, accordingly, relative to receptacle 83 by means of radially extending fingers 120, one for each space or recess between adjoining splines 114. It will be apparent that pawl plate 95 can travel downwardly against the compression of spring 110 until it contacts base plate 112. Downward travel of the stud extension is limited when the lower face of flange 106 contacts seats 116. This occurs before the pawl plate 95 contacts the base.

Certain structural details of the pawl and ratchet arrangement are made necessary because of the very limited space requirements in a fastener of this character. If more space were available a larger and somewhat more conventional pawl and ratchet arrangement may be employed.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. A quick operating fastener for securing two sheets together comprising a two-part stud structure and including a stud carried by one sheet and an externally threaded extension interlocked therewith when the parts are fastened, and an internally threaded nut device carried by the other sheet and receiving the stud structure and retaining the stud extension when the parts are unfastened, disengageable fastening means for interlocking the stud extension and stud upon the initial rotation of the latter, and releasable means for preventing rotation of the extension until positive interlock has been effected comprising pawl and ratchet means between the nut device and the stud extension and which are disengageable only upon rotation of the stud to interlocking engagement with the stud extension.

2. A quick operating fastener for securing two sheets together comprising a two-part stud structure and including a stud carried by one sheet and an externally threaded extension interlocked therewith when the parts are fastened, and an internally threaded nut device carried by the other sheet and receiving the stud structure and retaining the stud extension when the parts are unfastened, bayonet-type fastening means for interlocking the stud extension and stud upon the initial rotation of the latter, and releasable means for preventing rotation of the extension until interlock has been effected, said releasable means comprising a detent member slidably carried by the stud extension and a pawl plate carried by the detent member and secured against rotation relative to the nut device, ratchet teeth on the stud extension engageable with said pawl plate to lock the stud extension against rotation, a spring urging said pawl plate and ratchet teeth into interengagement, a cam surface on said detent member engageable by the stud and disengaging the pawl plate and ratchet teeth only upon rotation of the stud to interlocking engagament with the stud extension.

3. A quick operating fastener for securing two sheets together comprising a two-part stud structure and including a stud carried by one sheet and an externally threaded extension interlocked therewith when the parts are fastened, and an internally threaded nut device carried by the other sheet and receiving the stud structure and retaining the stud extension when the parts are unfastened, complemental bayonet-type fastening means for interlocking the stud extension and stud upon the initial rotation of the latter, and releasable means for preventing rotation of the extension until interlock has been effected and locking the stud extension against rotation, said releasable means comprising a pair of ratchet members including a first one positioned at the lower end of the stud extension, a cam surface on a second one of said ratchet members engageable by the stud and disengaging the first ratchet member therefrom only upon rotation of the stud to interlocking engagement with the stud extension.

4. A quick operating fastener for securing two sheets together comprising a two-part stud structure carried by one sheet and including a stud and an externally threaded extension interlocked therewith when the parts are fastened, and an internally threaded nut device carried by the other sheet and receiving the stud structure and retaining the stud extension when the parts are unfastened, complemental bayonet-type fastening means for interlocking the stud extension and stud upon the initial rotation of the latter, and automatic releasable means for preventing rotation of the extension until interlock has been effected, said means comprising a detent member slidably carried by the stud extension and a ratchet plate carried by the detent member and secured against rotation relative to the nut device, ratchet teeth on the stud extension engageable with said ratchet plate to lock the stud extension against rotation, a spring urging the ratchet teeth into interengagament with the rachet plate, a cam surface on said detent member engageable by the stud and disengaging the ratchet teeth from said rachet plate upon rotation of the stud to interlocking engagement with the stud extension.

5. The structure recited in claim 1 wherein the disengageable fastening means comprise complemental bayonet-type elements.

6. The structure recited in claim 2 wherein a cage is secured to the second sheet and the nut device is carried in the cage in floating relation.

7. A quick operating fastener for securing two sheets together comprising a two-part stud structure carried by one sheet and including a stud and an externally threaded extension interlocked therewith when the parts are fastened, and an internally threaded nut device carried by the other sheet and receiving the stud structure and retaining the stud extension when the parts are unfastened, complemental bayonet-type fastening means for interlocking the stud extension and stud upon the partial rotation of the latter, and means for prevetning rotation of the extension until interlock has been effected, said means comprising a detent member mounted within the stud extension for sliding movement upon engagement by the stud and a ratchet plate carried by said detent member, means preventing rotation of the ratchet plate relative to the nut device, ratchet teeth on the stud extension engageable with said ratchet plate to lock the stud extension against rotation, said ratchet plate being disengaged from the ratchet teeth upon partial rotation of the stud to effect the interlock.

References Cited in the file of this patent
UNITED STATES PATENTS

| | | |
|---|---|---|
| 2,807,854 | Mellen et al. | Oct. 1, 1951 |
| 2,878,543 | Newcomer | Mar. 24, 1959 |
| 2,881,499 | Summers et al. | Apr. 14, 1959 |